(12) United States Patent
Samra et al.

(10) Patent No.: US 7,669,203 B2
(45) Date of Patent: Feb. 23, 2010

(54) VIRTUAL MULTITHREADING TRANSLATION MECHANISM INCLUDING RETROFIT CAPABILITY

(75) Inventors: Nicholas G. Samra, Austin, TX (US); Andrew S. Huang, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1318 days.

(21) Appl. No.: 10/741,914

(22) Filed: Dec. 19, 2003

(65) Prior Publication Data
US 2005/0149700 A1 Jul. 7, 2005

(51) Int. Cl.
G06F 9/46 (2006.01)
G06F 9/44 (2006.01)

(52) U.S. Cl. ............ 718/100; 718/102; 718/104; 718/108; 712/233

(58) Field of Classification Search ........... 712/217, 712/244, 233; 718/100, 102, 104, 107, 108, 718/103
See application file for complete search history.

(56) References Cited

U.S. PATENT DOCUMENTS 5,692,193 A * 11/1997 Jagannathan et al. ...... 718/106
5,815,727 A * 9/1998 Motomura ................. 712/1
5,930,830 A * 7/1999 Mendelson et al. ........ 711/171
6,490,671 B1 * 12/2002 Frank et al. ............... 711/207
6,567,839 B1 * 5/2003 Borkenhagen et al. ..... 718/103
6,651,163 B1 * 11/2003 Kranich et al. ............ 712/244
6,697,935 B1 * 2/2004 Borkenhagen et al. ..... 712/228
7,290,261 B2 * 10/2007 Burky et al. ............... 718/107
2004/0250254 A1 * 12/2004 Frank et al. ............... 719/310
2005/0038964 A1 * 2/2005 Hooper et al. ............. 711/143
2005/0044301 A1 * 2/2005 Vasilevsky et al. ........ 711/1
2005/0138333 A1 * 6/2005 Samra ...................... 712/218
2005/0138629 A1 * 6/2005 Samra ...................... 718/107

OTHER PUBLICATIONS

Marr et al. ("Hyper-threading technology architecture and microarchitecture", Intel, Q1 2001, pp. 1-12).*

* cited by examiner

*Primary Examiner*—Meng-Ai An
*Assistant Examiner*—Caroline Arcos
(74) *Attorney, Agent, or Firm*—Trop, Pruner & Hu, P.C.

(57) ABSTRACT

Method, apparatus and system embodiments provide support for multiple SoEMT software threads on multiple SMT logical thread contexts. A thread translation table maintains physical-to-virtual thread translation information in order to provide such information to structures within a processor that utilize virtual thread information. By associating a thread translation table with such structures, a processor that supports simultaneous multithreading (SMT) may be easily retrofitted to support switch-on-event multithreading on the SMT logical processors.

21 Claims, 9 Drawing Sheets

| Phys. Thread ID | Virt. Thread ID |
|---|---|
| Phys. Thread 0 | 3 |
| Phys. Thread 1 | 0 |
| Slp. Thread 0 | 1 |
| Slp. Thread 1 | 2 |

150

| Phys. Thread ID | Virt. Thread ID |
|---|---|
| Phys. Thread 0 | 2 |
| Phys. Thread 1 | 0 |
| Slp. Thread 0 | 1 |
| Slp. Thread 1 | 3 |

VIRTUAL MULTITHREADING TRANSLATION MECHANISM INCLUDING RETROFIT CAPABILITY

BACKGROUND

1. Technical Field

The present disclosure relates generally to information processing systems and, more specifically, to a mapping mechanism that supports multiple SoEMT threads on multiple physical threads.

2. Background Art

In order to increase performance of information processing systems, such as those that include microprocessors, both hardware and software techniques have been employed. On the hardware side, microprocessor design approaches to improve microprocessor performance have included increased clock speeds, pipelining, branch prediction, super-scalar execution, out-of-order execution, and caches. Many such approaches have led to increased transistor count, and have even, in some instances, resulted in transistor count increasing at a rate greater than the rate of improved performance.

Rather than seek to increase performance through additional transistors, other performance enhancements involve software techniques. One software approach that has been employed to improve processor performance is known as "multithreading." In software multithreading, an instruction stream may be split into multiple instruction streams that can be executed in parallel. Alternatively, two independent software streams may be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as a chip multiprocessor ("CMP") system, may each act on one of the multiple threads simultaneously. In another approach, referred to as simultaneous multithreading ("SMT"), a single physical processor is made to appear as multiple logical processors to operating systems and user programs. For SMT, multiple threads can be active and execute simultaneously on a single processor without switching. That is, each logical processor maintains a complete set of the architecture state, but many other resources of the physical processor, such as caches, execution units, branch predictors control logic and buses are shared. For SMT, the instructions from multiple software threads thus execute concurrently on each logical processor.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of an apparatus, system and methods for a mapping mechanism that supports multiple SoEMT software threads on multiple SMT logical thread contexts.

DETAILED DESCRIPTION

In the following description, numerous specific details such as processor types, multithreading environments, microarchitectural structures, and thread switching methodology have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

A particular hybrid of multithreading approaches is disclosed herein. Particularly, a combination of SoEMT and SMT multithreading approaches is referred to herein as a "Virtual Multithreading" environment. For SMT, two or more software threads may run simultaneously in separate logical contexts. For SoEMT, only one of multiple software threads is active in a logical context at any given time. These two approaches are combined in Virtual Multithreading. In Virtual Multithreading, each of two or more logical contexts supports two or more SoEMT software threads, referred to as "virtual threads."

For example, three virtual software threads may run on an SMT processor that supports two separate logical thread contexts. Any of the three software threads may begin running, and then go into an inactive state upon occurrence of an SoEMT trigger event. The inactive state may be referred to herein as a "sleep" mode, although the term "sleep mode" is not intended to be limiting as used herein. "Sleep mode" thus is intended to encompass, generally, the inactive state for an SoEMT thread.

Because expiration of a TMUX multithreading timer may be considered a type of SoEMT trigger event, the use of the term "SoEMT" with respect to the embodiments described herein is intended to encompass multithreading wherein thread switches are performed upon the expiration of a TMUX timer, as well as upon other types of trigger events, such as a long latency cache miss, execution of a particular instruction type, and the like.

When resumed, a sleeping software thread need not resume in the same logical context in which it originally began execution—it may resume either in the same logical context or on the other logical context. In other words, a virtual software thread may switch back and forth among logical contexts over time. Disclosed herein is a mechanism to map virtual software threads to logical contexts (also referred to herein as "physical threads") in order to support the hybrid Virtual Multithreading environment.

Figure 1:
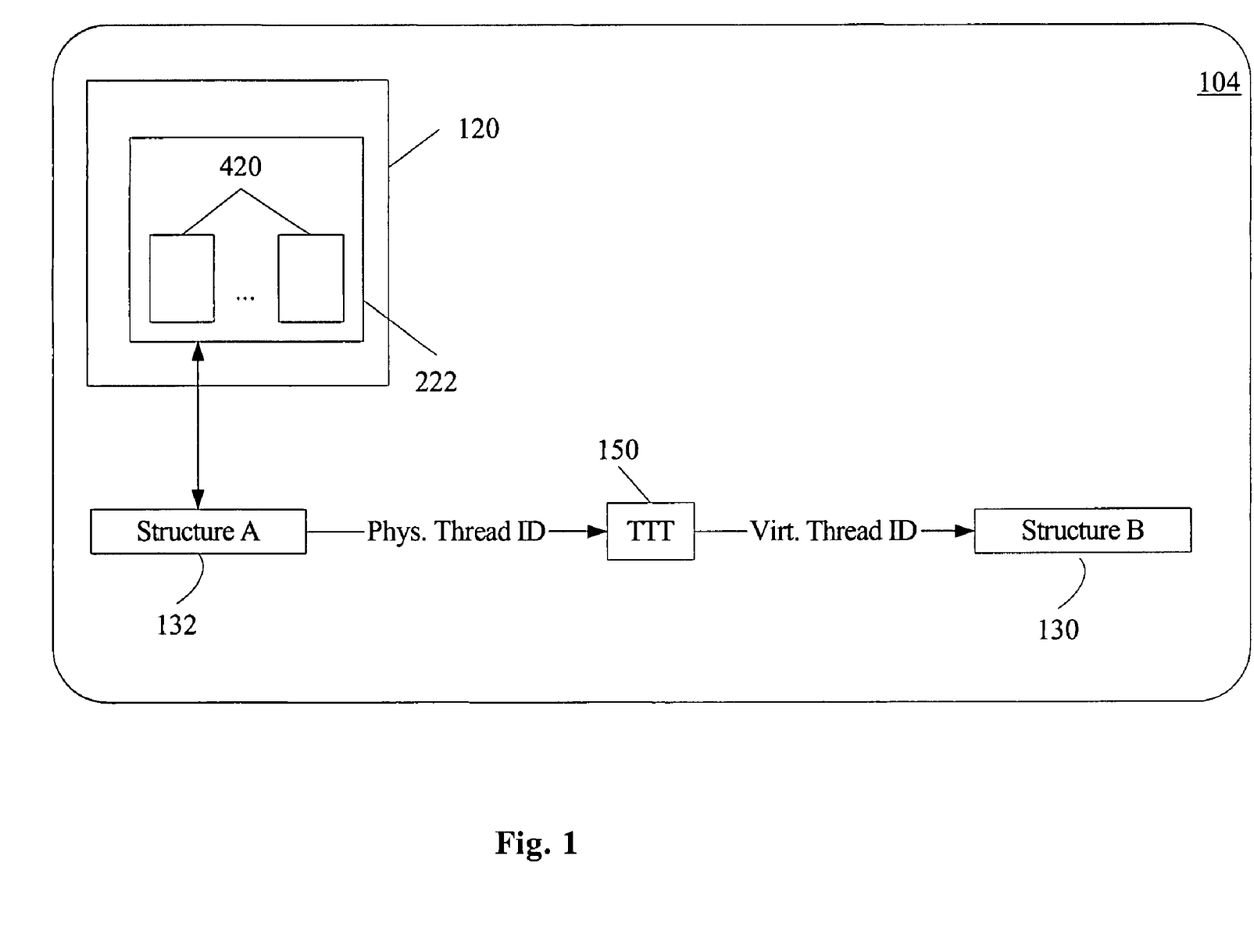
FIG. 1 is a block diagram of at least one embodiment of a multi-threaded processor that includes a thread translation table.

FIG. 1 is a block diagram illustrating a processor 104 capable of performing the disclosed techniques to map virtual threads to physical threads in a manner that reduces overhead and supports retrofitting an SMT processor to support virtual multithreading. The processor 104 may include a front end 120 that prefetches instructions that are likely to be executed.

For at least one embodiment; the front end 120 includes a fetch/decode unit 222 that includes logically independent sequencers 420 for each of one or more physical thread contexts. The physical thread contexts may also be interchangeably referred to herein as "logical processors" and/or "physical threads." The single physical fetch/decode unit 222 thus includes a plurality of logically independent sequencers 420, each corresponding to a physical thread.

FIG. 1 illustrates that at least one embodiment of the processor 104 includes one or more copies of a thread translation table ("TTT") 150. The thread translation table 150 helps certain arrays or other structures in the processor 104 distinguish among virtual threads. These structures may include a reorder buffer (see 910, FIG. 9), memory ordering buffer, branch prediction array (see 920, FIG. 9) and other structures that track state in the processor 104.

Structure A 132 represents such a structure that need not necessarily distinguish among virtual threads for its own processing. Structure B 130 represents such a structure that utilizes virtual thread information in order to process its own entries.

FIG. 1 illustrates that the TTT 150 enables a processor to associate the state that Structure A 132 tracks with a particular virtual thread. By maintaining certain mapping information, the TTT 150 enables the processor to distinguish among two or more virtual threads without requiring mapping information to be carried in each entry of Structure A 132. This overhead space savings can be significant for large structures, or for processors that support a large number of virtual threads. The TTT 150 allows the same association between array state and virtual thread ID without this excessive overhead.

Figure 2:
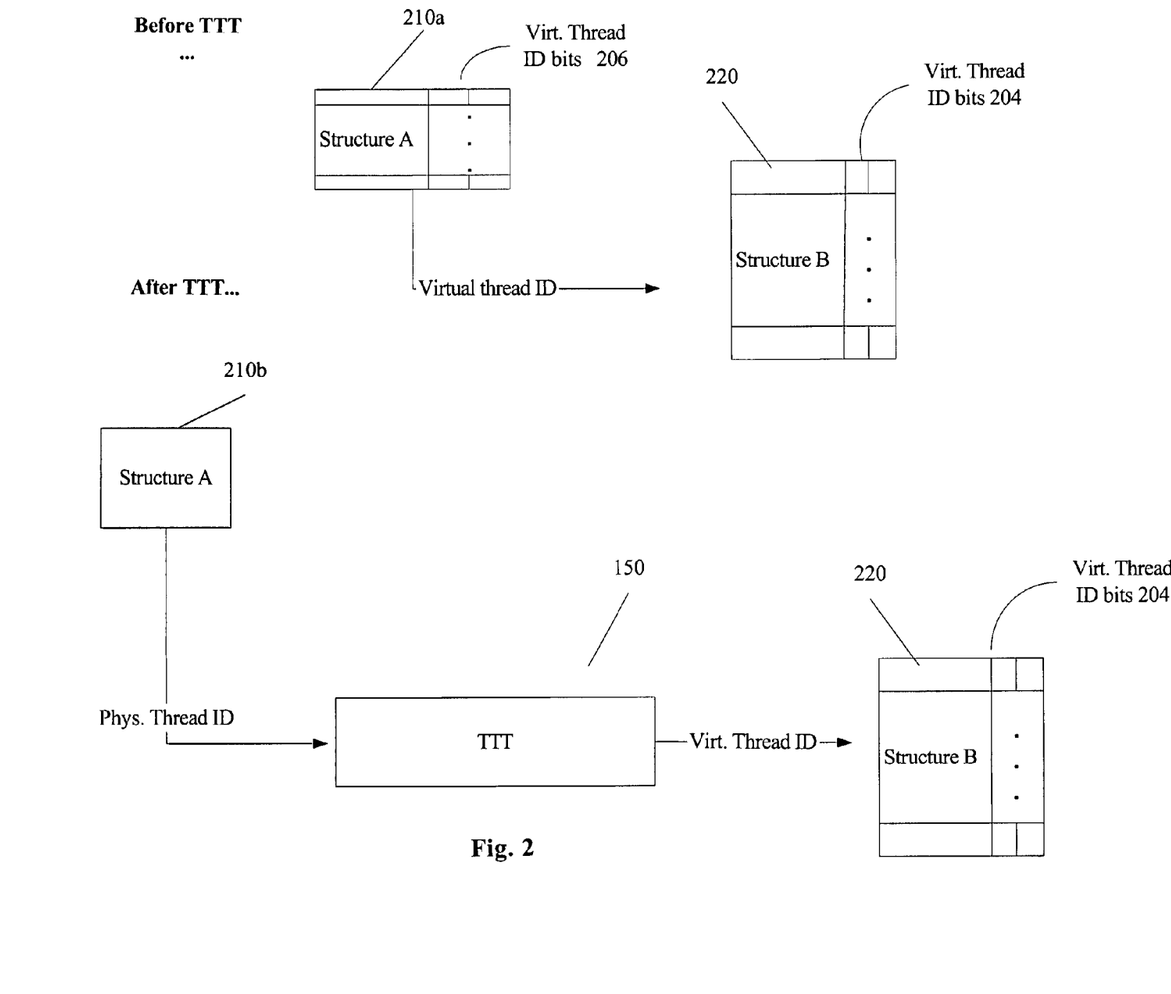
FIG. 2 is a block diagram illustrating at least one aspect of overhead savings provided by a thread translation table.

FIG. 2 illustrates at least one aspect of the potential overhead savings provided by a TTT 150. FIG. 2 illustrates a structure, Structure B, which associates each entry with a given virtual thread. In other words, Structure B 220 is the type of structure that distinguishes among virtual threads for the processing of its entries. Structure B distinguishes among virtual threads via virtual thread ID bits 204 for each entry. The number of virtual threads supported in the virtual multithreading environment directs the number of virtual thread ID bits 204. The number of bits 204 is sufficient to distinguish among all virtual threads. For example, for a processor that supports three or four virtual threads, each entry of structure B maintains two virtual thread ID bits, in order to represent each of the four virtual threads.

FIG. 2 also illustrates a structure, Structure A 210a, that need not distinguish among virtual threads for the processing associated with its entries. For example, Structure A 210a may be a reorder buffer that only distinguishes among physical thread IDs in order to process its entries. Nonetheless, FIG. 2 illustrates that, without a TTT 150, Structure A 210a maintains virtual thread ID bits 206 in order to translate physical thread ID to virtual thread ID for each of its entries. In this manner, the virtual thread ID bits 206 are maintained as overhead in order to provide a virtual thread ID to Structure B 220, which needs such virtual thread ID in order to process its entries. For large structures, the overhead associated with virtual thread ID bits 206 may be unacceptably large. In addition, the virtual thread ID bits 206 may further cause undesirable overhead when routed through the various pipelines of the processor among functional units.

FIG. 2 illustrates that, when a TTT 150 is employed, Structure A 210b need not maintain virtual thread ID bits 206. Instead, the TTT 150 provides translation information. FIG. 2 shows that the TTT 150 maintains a single set of translation bits, as opposed to maintaining virtual thread ID bits 206 for each entry of Structure A 210a.

Accordingly, the TTT 150 is a relatively small translation table that provides a translation mapping between physical threads and virtual threads. For at least one embodiment, a TTT 150 is associated with each structure within a processor that utilizes virtual thread ID information for the processing of its own entries.

Figure 3:
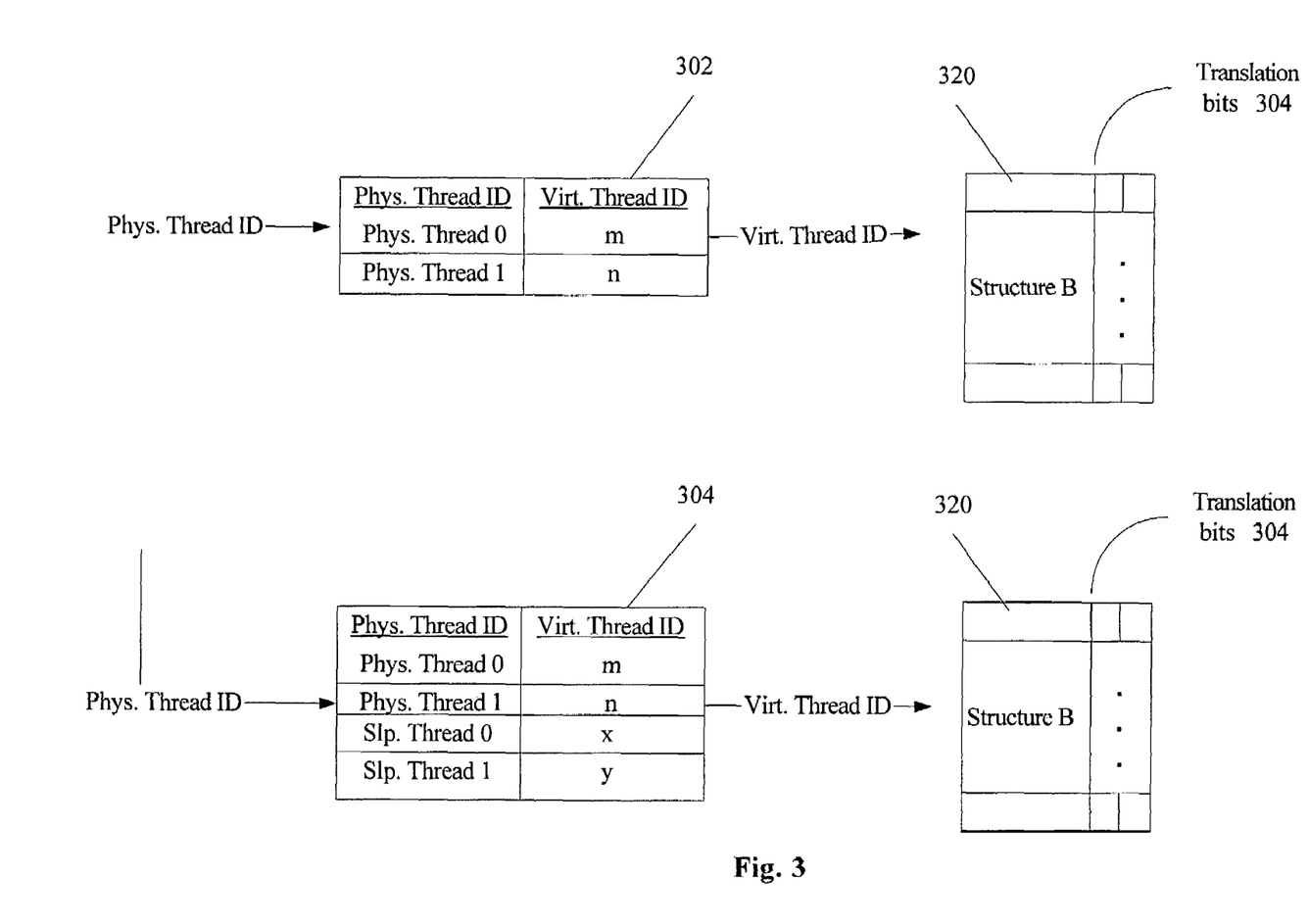
FIG. 3 is a block diagram illustrating further detail for at least two embodiments of a thread translation table.

FIG. 3 illustrates further detail for at least two embodiments, 302, 304 of a TTT. FIG. 3 illustrates that one embodiment 302 of a TTT maintains mapping information for the active virtual thread on each physical thread. Although only two entries are shown in TTT 302, it is of course obvious to one of skill in the art that an SMT processor may maintain more than two physical threads. In such case, an additional entry of the TTT 302 maintains the active virtual thread for each of the additional physical threads.

FIG. 3 illustrates that at least one other embodiment of the TTT 304 maintains information regarding both active and sleeping threads for each of the physical threads. Again, only two physical threads are illustrated in table TTT 304, and two virtual threads are illustrated for each of the physical threads. However, one of skill in the art will again recognize that more than two physical threads may be supported.

In addition, more or less than four virtual threads may be supported. For example, three SoEMT virtual software threads may be interchangeably supported on two physical threads. Similarly, more than four virtual threads may be supported in other embodiments. Accordingly, additional or fewer entries of the TTT 304 may be maintained to reflect the number of supported virtual threads.

Figure 9:
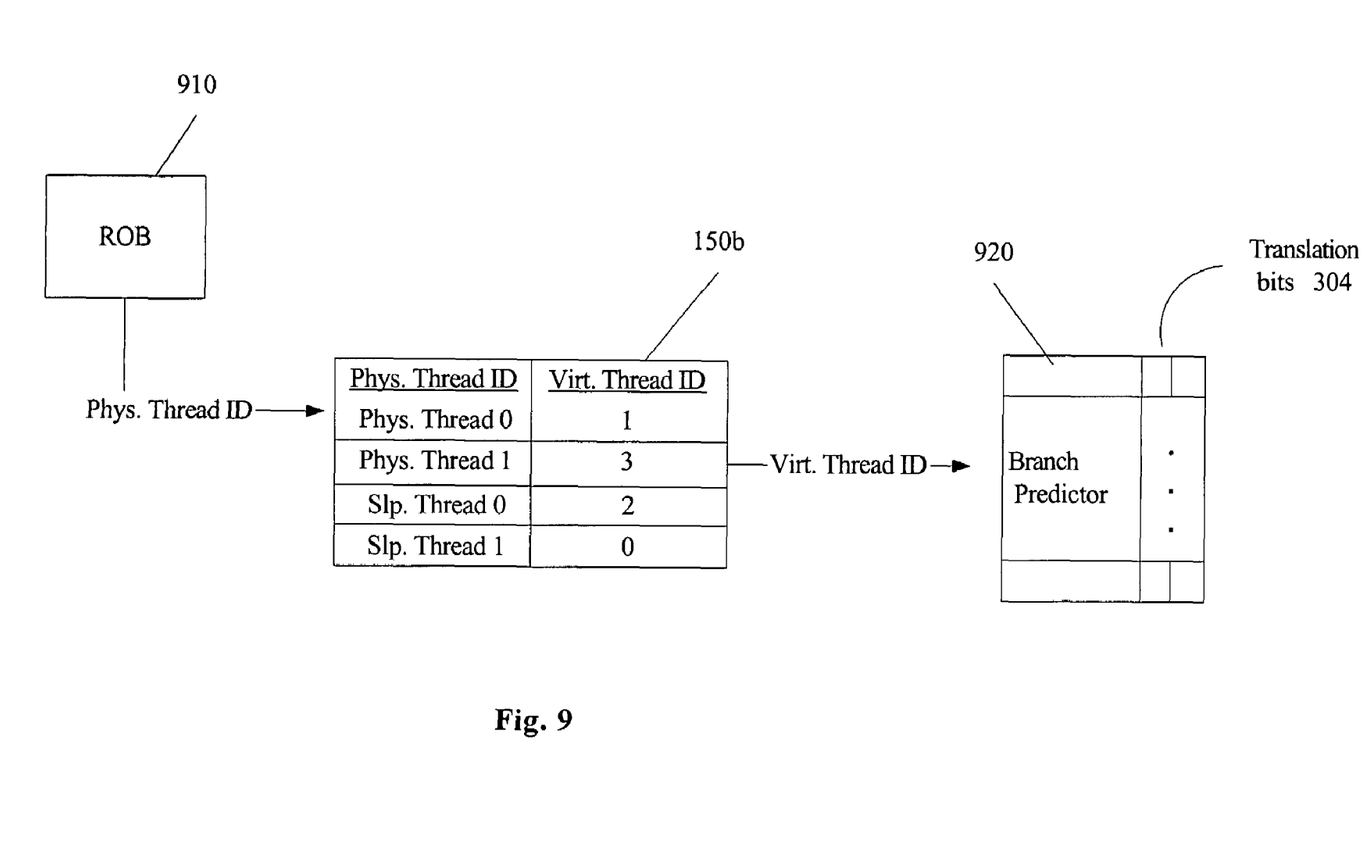
FIG. 9 is a block diagram illustrating an example of physical-to-virtual thread translation using a thread translation table.

In addition to the mapping information illustrated in FIG. 3, the TTT 150 may also include additional control logic elements, such as multiplexers, that enable the TTT 150 to perform entry modification (see, for example, method 500 in FIG. 5) and lookup (see, for example, method 800 in FIG. 9).

The TTT 130 may provide retrofit capability so that an SMT processor may support virtual multithreading. By providing a TTT 130 for each structure that should distinguish among two or more virtual threads, the SMT processor may be retrofitted to provide a virtual multithreading environment.

Figure 4:
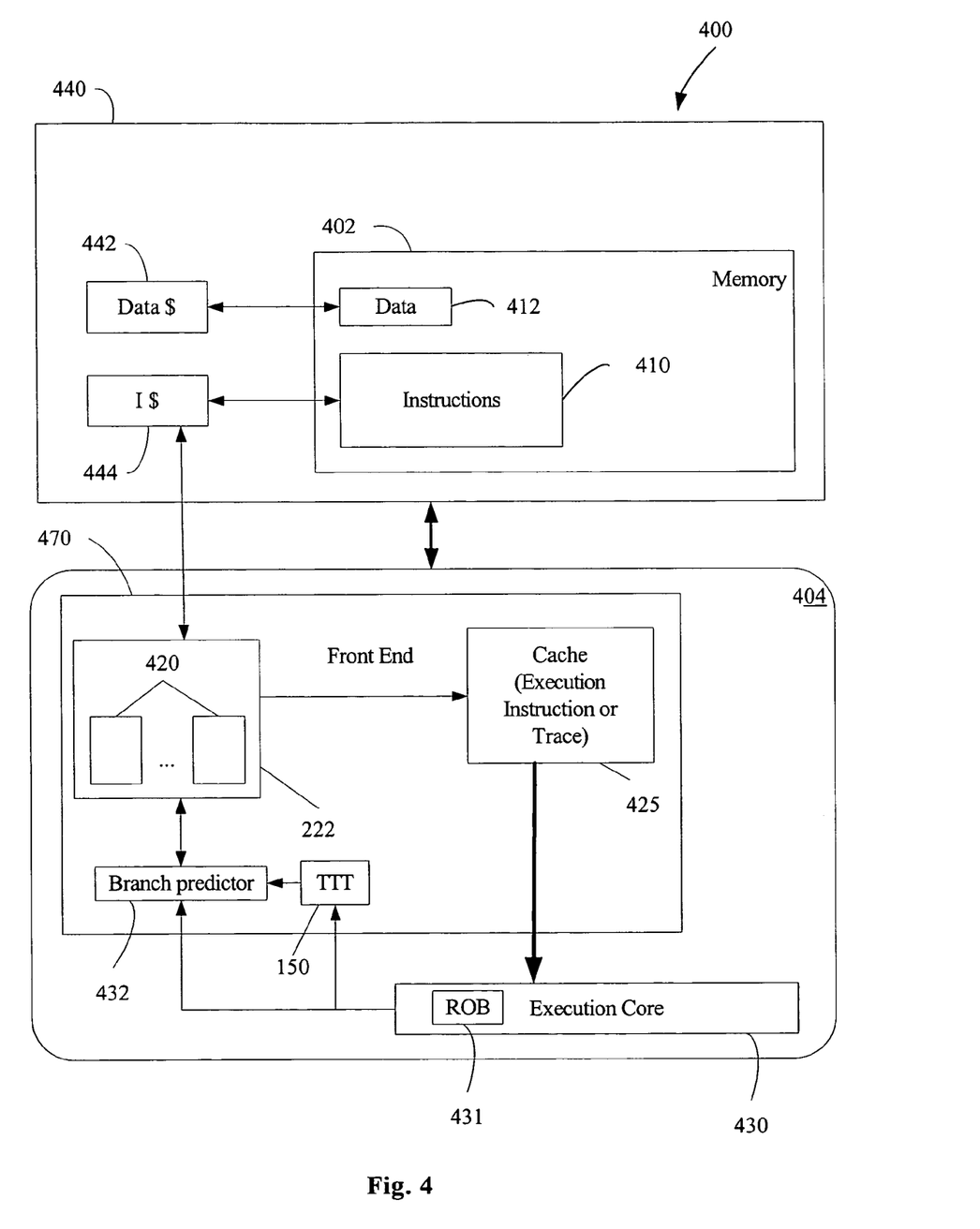
FIG. 4 is a block diagram illustrating at least one embodiment of a processing system capable of utilizing disclosed techniques.

FIG. 4 is a block diagram illustrating at least one embodiment of a computing system 400 capable of performing the disclosed techniques to map virtual threads to physical threads. The computing system 400 includes a processor 404 and a memory 402. Memory 402 may store instructions 410 and data 412 for controlling the operation of the processor 404.

The processor 404 may include a front end 470 along the lines of front end 120 described above in connection with FIG. 1. Front end 470 supplies instruction information to an execution core 430. For at least one embodiment, the front end 470 prefetches instructions that are likely to be executed. For at least one embodiment, the front end 470 may supply the instruction information to the execution core 430 in program order.

A branch prediction unit 432 may supply branch prediction information in order to help the front end 420 determine which instructions are likely to be executed. The branch prediction unit 432 may be implemented as an array.

At least one embodiment of processor 404 includes an execution core 430 that prepares instructions for execution, executes the instructions, and retires the executed instructions. The execution core 430 may include out-of-order logic to schedule the instructions for out-of-order execution. The execution core 430 may include one or more buffers that it utilizes to smooth and re-order the flow of instructions as they flow through the execution pipeline and are scheduled for execution. These buffers may include one or more of a reorder buffer 431, a memory ordering buffer, load request buffers, store request buffers, and the like.

The execution core 430 may include retirement logic (not shown) that reorders the instructions, executed in an out-of-order manner, back to the original program order. This retirement logic receives the completion status of the executed instructions from the execution units (not shown) and processes the results so that the proper architectural state is committed (or retired) according to the program order. The retirement logic also reports branch history information to the branch predictor 432 at the front end 470 of the processor 404 so they can train with the latest known-good branch-history information.

As used herein, the term "instruction information" is meant to refer to basic units of work that can be understood and executed by the execution core 430. Instruction information may be stored in a cache 425. The cache 425 may be implemented as an execution instruction cache or an execution trace cache. For embodiments that utilize an execution instruction cache, "instruction information" includes instructions that have been fetched from an instruction cache and decoded. For embodiments that utilize a trace cache, the term "instruction information" includes traces of decoded micro-operations. For embodiments that utilize neither an execution instruction cache nor trace cache, "instruction information" also includes raw bytes for instructions that may be stored in an instruction cache (such as I-cache 444).

The processing system 400 includes a memory subsystem 440 that may include one or more caches 442, 444 along with the memory 402. Although not pictured as such in FIG. 4, one skilled in the art will realize that all or part of one or both of caches 442, 444 may be physically implemented as on-die caches local to the processor 404. The memory subsystem 440 may be implemented as a memory hierarchy and may also include an interconnect (such as a bus) and related control logic in order to facilitate the transfer of information from memory 402 to the hierarchy levels. One skilled in the art will recognize that various configurations for a memory hierarchy may be employed, including non-inclusive hierarchy configurations.

It will be apparent to one of skill in the art that, although only an out-of-order processing system 400 is illustrated in FIG. 4, the embodiments discussed herein are equally applicable to in-order processing systems as well. Such in-order processing systems typically do not include ROB 431. Nonetheless, such in-order systems may still include one or more copies of a TTT 150 in order to provide for virtual thread translation between those structures those that do not utilize virtual thread ID information and those that do.

Figure 5:
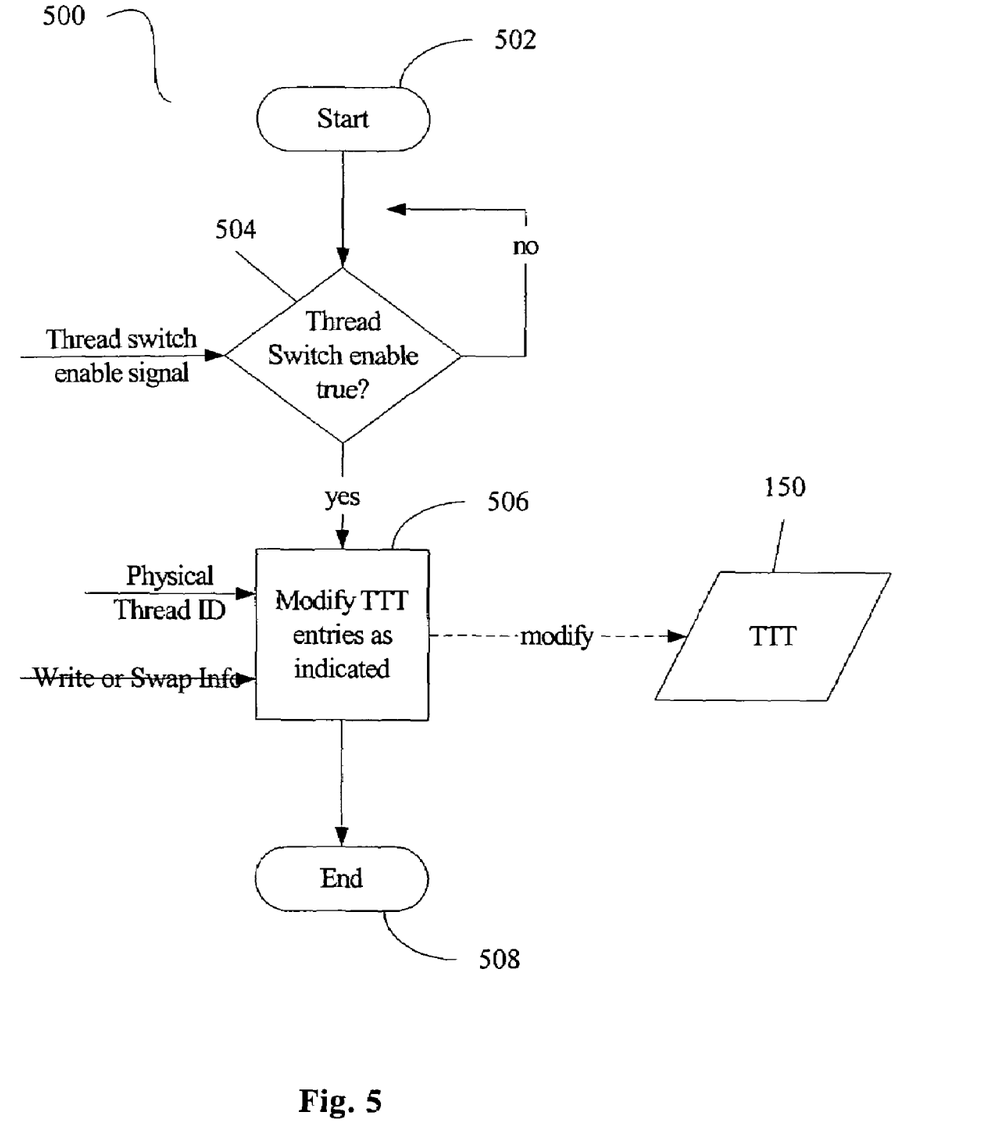
FIG. 5 is a flow diagram illustrating a method of updating a thread translation table.

FIG. 5 is as flow diagram illustrating a method of updating the entries of a TTT 150 in order to provide accurate physical-to-virtual thread translation. FIG. 5 illustrates control flow and data flow for a method 500 of updating the TTT 150 upon a thread switch. The method 500 may be performed by control logic associated with each TTT 150 in a processor. FIG. 5 illustrates that the method 500 may involve a three-signal interface to the control logic associated with each TTT 150. The interface includes a thread switch enable signal and a physical thread ID signal. In addition, the interface may include a third signal. For an embodiment employing a swap methodology, described below, the third signal may be a sleeping thread ID signal. For an alternative embodiment that employs an overwrite methodology, the third signal may be a virtual thread ID. Each of the embodiments is discussed in further detail below.

Although only one TTT 150 is illustrated in FIG. 5, one of skill in the art will recognize that the method 500 may be performed for each of multiple copies of a TTT 150 within a processor.

FIG. 5 illustrates that such processing begins at block 502. When a trigger event occurs in a processor (such as processor 104 in FIG. 1 or processor 404 in FIG. 4) such that the processor should switch out the virtual thread that is active on a given physical thread, a thread switch enable signal may be asserted. For at least one embodiment, the trigger event may be a processor event, such as a long latency cache miss. For at least one other embodiment, the trigger may be the expiration of a TMUX multithreading timer. FIG. 5 illustrates that processing proceeds to block 504 from block 502.

At block 504, it is determined whether a trigger event has occurred. For at least one embodiment, this determination is based on whether a thread switch enable signal has been asserted. If not, then processing returns to block 504 and continues to monitor for such event. Of course, one skilled in the art will recognize that the polling loop at block 504 need not necessarily be implemented as an active poll function. Instead, for instance, one of skill in the art will recognize that the assertion of the thread switch enable signal may be detected passively, such as through an interrupt or other exception processing.

Regardless of the detection approach implementation, it is determined at block 504 whether a trigger event has occurred. If so, then processing proceeds to block 506. At block 506, control logic associated with the TTT 150 modifies the TTT entries.

For at least one embodiment, the modification at block 506 is a swap. That is, the TTT 150 may be implemented to track sleeping threads, such as the TTT 150a illustrated in FIG. 3. For such embodiment, the "write or swap info" received at block 506 is actually a swap information signal. The value of the swap information signal indicates the ID of sleeping thread to be swapped out for the active thread indicated by the physical thread ID (the physical thread ID is also received at block 506). At block 506, the current virtual thread ID for the indicated physical thread is swapped out for the indicated sleeping thread.

In this manner, the TTT 150 indicates that the currently active thread on the physical thread indicated by the physical thread ID signal is to go inactive, while the currently sleeping thread indicated by the sleeping thread ID is to be made active on the indicated physical thread. The currently active virtual thread for the indicated physical thread is swapped out; and the virtual thread ID for the (currently sleeping) virtual thread that is being activated is swapped in. Processing then ends at block 508. One of skill in the art will recognize that, in an active polling implementation, after ending at block 508 the method 500 may nearly immediately begin execution again at block 502.

For an alternative embodiment, referred to as an overwrite methodology, a virtual thread ID is received at block 506 as the "write or swap info." The virtual thread ID is considered "write" information. The overwrite methodology may be utilized for an embodiment of the TTT, such as TTT 150b illustrated in FIG. 3, that only tracks active virtual threads and does not track sleeping virtual threads. For such embodiments, since the sleeping threads are not tracked in the TTT, a swap is not performed. Instead, the value at the TTT entry for the indicated physical thread ID is overwritten with the incoming "write" information.

Figure 6:
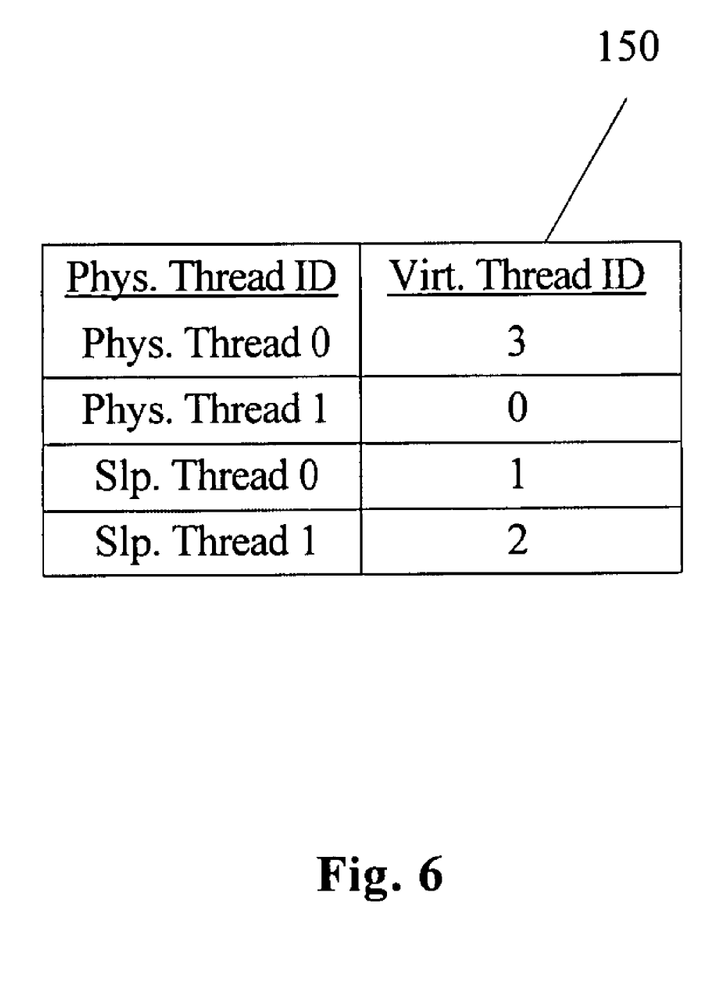
FIG. 6 is block diagram illustrating example of thread translation entries for an illustrative virtual multithreading example before a thread switch.
Figure 7:
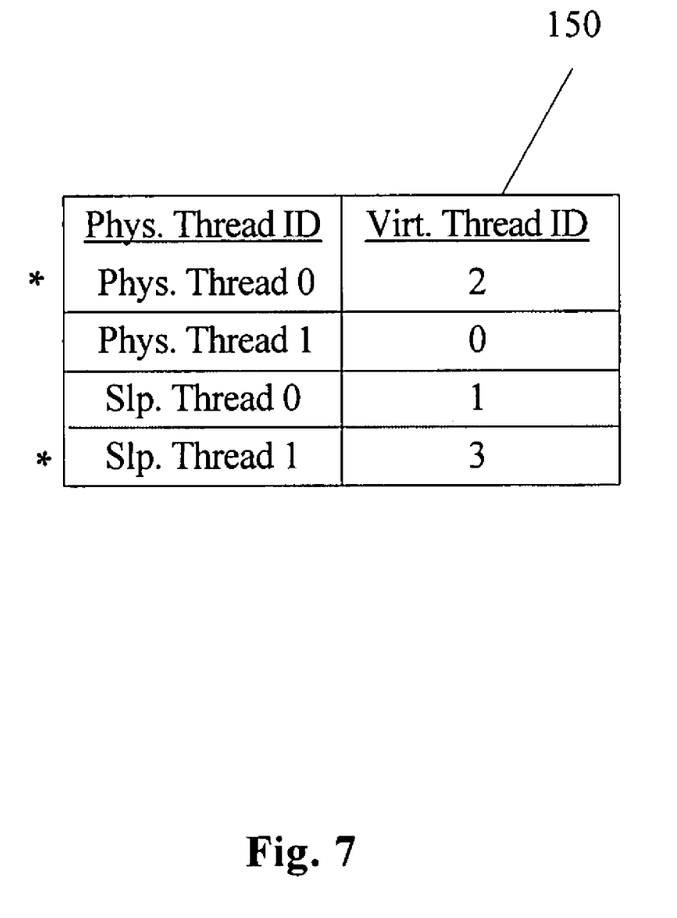
FIG. 7 is block diagram illustrating example of thread translation entries for an illustrative virtual multithreading example after a thread switch.

FIGS. 6 and 7 will now be discussed in connection with FIG. 5 in order to provide an illustrative example of thread switch processing in a virtual multithreading environment. FIG. 6 is a block diagram illustrating the contents of a thread translation table 150 for an illustrative virtual multithreading example before a thread switch. FIG. 7 is a block diagram illustrating the contents of the thread translation table 150 for the illustrative virtual multithreading example after a thread switch.

For the example illustrated in FIGS. 6 and 7, it is assumed that a processor (such as processor 404 illustrated in FIG. 4) is an SMT processor that provides two physical threads. For such example it is also assumed that the processor supports four SoEMT virtual threads. As is explained above, the example is for illustrative purposes only. One of skill in the art will recognize, of course, that the swap method 500 may be performed for M physical threads, which support N virtual SoEMT threads, where M≧2 and N≧2.

FIG. 6 illustrates an initial contents for the TTT and represents an initial state of the TTT 150 at the time that block 502 of the method is first entered for our example. The contents of the TTT 150 illustrated in FIG. 6 are based on the illustrative assumption that four virtual threads (virtual thread ID 0-3) are mapped to two physical threads (physical thread 0-1). The initial state shown in FIG. 6 illustrates that virtual thread 3 is active on physical thread 0 and that virtual thread 0 is active on physical thread 1. Virtual thread 1 and virtual thread 2 are not active but are, rather, in a an inactive, or "sleep," state.

For at least one embodiment of the TTT, such as embodiment 150a illustrated in FIG. 3, only the physical thread ID's are tracked in the TTT 150. The optional nature of the sleeping thread ID information is indicated in FIGS. 6 and 7 with shading. For such embodiment, less entries are maintained in the TTT 150, but more bits may be required to reflect virtual thread values.

For our example, assume that virtual thread 3, currently active on physical thread 0, has suffered a trigger event such as a long-latency cache miss. Such trigger event causes the processor to assert the thread switch enable signal.

At block 504, the assertion of the thread switch enable signal is detected and processing proceeds to block 506. For purposes of our example, consider that the physical thread ID signal, received at block 506, carries a value of "0." Also consider that the sleeping thread ID, also received at block 506, carries a value of "1." That is, due to the trigger event, the processor has decided to put the triggering virtual thread (thread 3) to sleep and to instead activate virtual thread 2 on physical thread 0.

The TTT entry for physical thread 0 is to be modified, as indicated by the value of "0" for the physical thread ID signal received at block 506. The TTT entry for sleeping thread 1 is also to be modified, given the value of "1" for the sleeping thread ID signal (which was received as the "swap" signal at block 506). The TTT entries to be modified at block 506, given these input signal values, are denoted in FIG. 7 with asterisks.

FIG. 7 illustrates the change in values for the TTT 150 as a result of the swap processing at block 506 of FIG. 5. The change in values illustrated in FIG. 7 is based on the assertion of the physical thread ID value of "0" and the sleeping thread ID value of "1" discussed above. That is, the values are swapped, such that virtual thread 3 is now sleeping and virtual thread 2 is now the active virtual thread on physical thread 0. Processing then ends at block 508.

Figure 8:
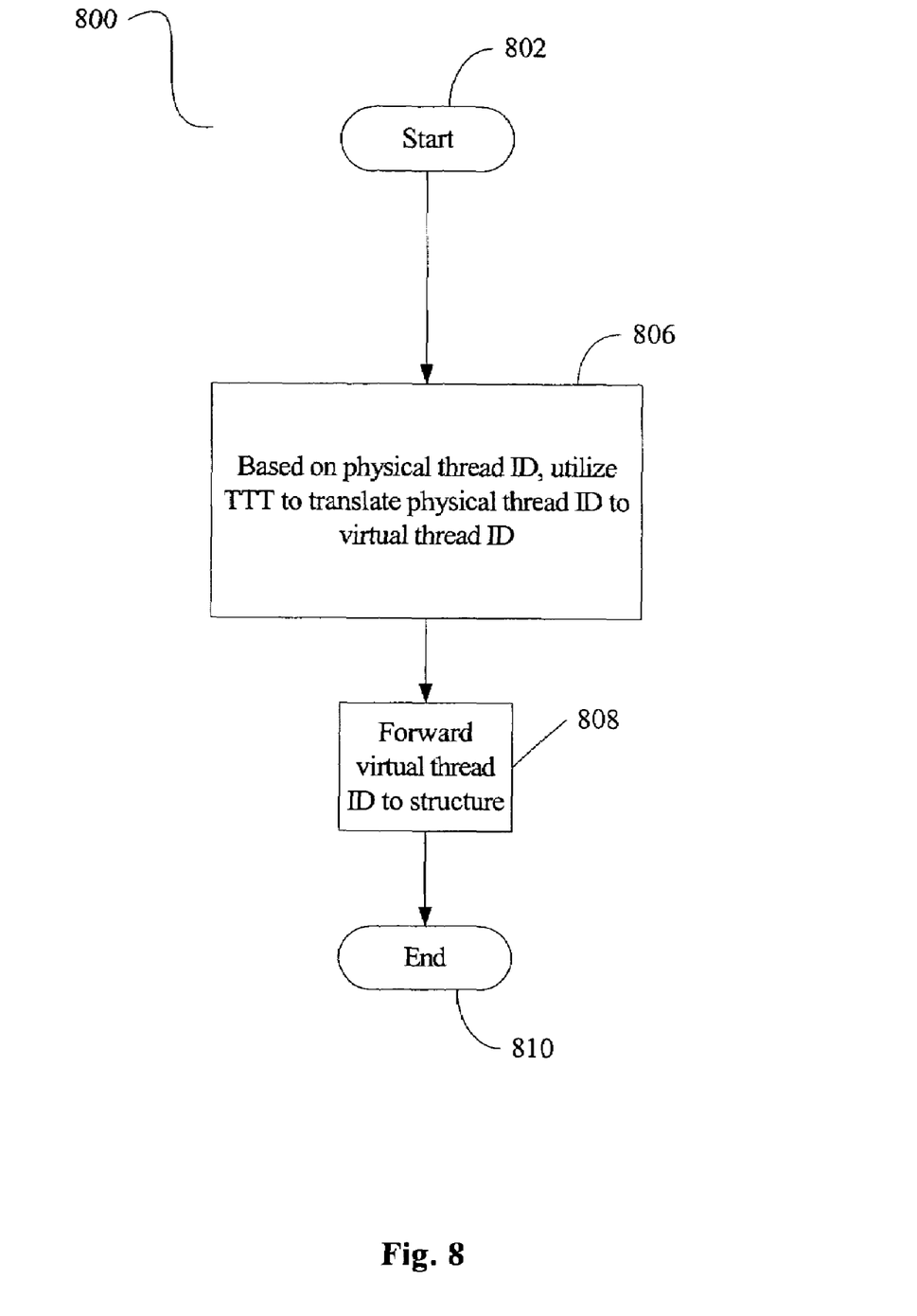
FIG. 8 is a flowchart illustrating at least one embodiment of a method for translating physical thread ID's to virtual thread ID's in a virtual multithreading environment.

FIG. 8 is a flowchart illustrating a method 800 for utilizing a thread translation table to perform physical-to-virtual thread translation. The method may be invoked, for instance, when access to is desired to a structure that utilizes virtual thread IDs in the processing of its entries. As used herein, a structure that utilizes virtual thread information is referred to as a "virtual thread structure." For at least one embodiment, it is assumed that the structure that utilizes virtual thread information is shared by the N virtual thread contexts of a processor.

Method 800 may be performed, for at least one embodiment, during those machine cycles when access to a virtual thread structure is desired. For example, method 800 may be performed during a machine cycle that retires an instruction. Upon such retirement, it may be desirable to update at least one virtual thread structure, such as a branch prediction array.

For at least one other embodiment, the method 800 may performed regularly, such as during each machine cycle. For such embodiment, a validity signal may be provided to the virtual thread structure in order to signify whether or not the virtual thread ID should be utilized during the present cycle. For instance, for an embodiment that performs method 800 for every cycle, a separate validity signal may be provided to the virtual thread structure in order to indicate, for example, whether or not an instruction is being retired during the current cycle.

FIG. 8 illustrates that the method begins at block 802 and proceeds to block 806. At block 806, the physical thread is utilized to perform a lookup in the TTT to determine the appropriate virtual thread ID. The virtual thread ID is provided to the virtual thread structure at block 508, and processing ends at block 510.

The method 800 of FIG. 8 is now further discussed in connection with an example illustrated in FIG. 9. FIG. 9 illustrates a first structure, a reorder buffer 910, which does not need to differentiate among virtual threads. At least one embodiment of reorder buffer 910 need not even receive a physical thread indicator. That is, reorder buffer 910 may have x entries that are statically partitioned, with first x/2 entries being allocated for a first physical thread and the second x/2 entries being allocated for a second physical thread. Accordingly, the physical thread ID associated with each entry of the reorder buffer 910 may be determined from the entry number itself. Of course, for a processor that supports M physical threads, where M>2, then the entries of the reorder buffer 910 may be statically partitioned such that x/M entries is allocated for each one of the M physical threads.

FIG. 9 further illustrates a branch predictor 920, which is implemented as a branch predictor array. Each entry of the array is associated a virtual thread. Accordingly, the branch predictor array 920 is a "virtual thread structure" that utilizes virtual thread ID information to process its entries.

For purposes of the example illustrated in FIG. 9, it assumed that method 800 has been invoked because retirement of an instruction entry from the reorder buffer has occurred during the present cycle, with the result that the branch predictor array 920 should be updated accordingly. In order to facilitate the update of the branch predicator array 920, a translation of the physical thread ID (provided by the reorder buffer 910) into a virtual thread ID should occur.

Although not illustrated in FIG. 8, it has been described above that method 800 may alternatively be invoked every cycle, with a valid bit indicating to the branch predictor array 920 whether or not to utilize the virtual thread ID provided at block 808 during the present cycle.

FIGS. 8 and 9 illustrate that, at block 806, the physical thread ID for the instruction retired from the reorder buffer 910 is provided to the TTT 150. Utilizing the physical thread ID for the instruction retired from the reorder buffer 910, lookup logic associated with the TTT 150 utilizes the mapping information maintained in the TTT 150 to map the physical thread ID to the currently active virtual thread for such physical thread. For example, for physical thread ID 0, the TTT illustrated in FIG. 9 indicates that virtual thread 1 is the currently active virtual thread. At block 808, such virtual thread value is provided to the branch predictor 920. Processing then ends at block 810.

The foregoing discussion describes selected embodiments of methods, systems and apparatuses to provide physical-to-virtual thread translation among differing types of structures within a processor. At least one embodiment of the apparatus contains a thread translation table in a processor implemented as a multithreaded processor wherein certain structures are shared among two or more physical threads. The physical threads support two or more SoEMT virtual threads.

In the preceding description, various aspects of methods, system and apparatuses have been described. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

Embodiments of the method may be implemented in hardware, hardware emulation software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

At least one embodiment of an example of such a processing system is shown in FIG. 4. Sample system 400 may be used, for example, to execute the processing for a method of translating virtual to physical threads in a virtual multithreading environment, such as the embodiments described herein. Sample system 400 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

Referring to FIG. 4, sample processing system 400 includes a memory system 402 and a processor 404. Memory system 402 may store instructions 410 and data 412 for controlling the operation of the processor 404.

Memory system 402 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 402 may store instructions 410 and/or data 412 represented by data signals that may be executed by processor 404. The instructions 410 and/or data 412 may include code for performing any or all of the techniques discussed herein.

While particular embodiments of the present invention have been shown and described, it will be obvious to those skilled in the art that changes and modifications can be made without departing from the present invention in its broader aspects.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A processor comprising:

a front end including a fetch/decode unit to prefetch instructions for a first physical thread that includes a set of a first architecture state of the processor and for a second physical thread that includes a set of a second architecture state of the processor, the fetch/decode unit including a first sequencer corresponding to the first physical thread and a second sequencer corresponding to the second physical thread, wherein the processor is a simultaneous multithreading (SMT) processor;

the first physical thread to support two or more switch-on-event software threads;

the second physical thread to support the two or more switch-on-event software threads; and a thread translation table to maintain mapping information for the first physical thread, the second physical thread, and the software threads, and including a plurality of entries each to store a physical thread identifier associated with one of the physical threads and a virtual thread identifier associated with one of the switch-on-event software threads, wherein the thread translation table is accessed by a physical thread identifier from a first structure of the processor and the corresponding virtual thread identifier is to be output to a second structure that uses the virtual thread identifier to process entries within the second structure, wherein the mapping information is to indicate one of the switch-on-event software threads as an active thread that is executing on the first physical thread and another one of the switch-on-event software threads as an active thread that is executing on the second physical thread.

2. The processor of claim 1, wherein:
the mapping information is further to indicate the remaining switch-on-event threads as inactive threads that are not executing on a physical thread.

3. The processor of claim 1, further comprising:
control logic to determine a virtual thread identifier associated with one of the software threads based on the mapping information.

4. The processor of claim 3, wherein the second structure is to receive the virtual thread identifier, the second structure corresponding to a branch predictor.

5. The processor of claim 3: wherein:
the first structure is to provide to the control logic a physical thread identifier associated with one of the physical threads, and wherein the first structure does not distinguish entries using a virtual thread identifier.

6. A processor comprising:
M logical processors, each M logical processor to support two or more software threads;
an execution core to execute instructions for the M logical processors and including a first buffer to output a physical thread identifier indicating one of the M logical processors;
a translation table coupled to the execution core to map one of N virtual thread identifiers with each of the M logical processors to indicate an active software thread that is executing on each of the M logical processors, where N>M, the translation table having a plurality of entries each to store one of the virtual thread identifiers for an active software thread or an inactive software thread that is not executing on one of the M logical processors, and further including control logic to receive the physical thread identifier from the first buffer and to perform a lookup based upon the physical thread identifier to determine the virtual thread identifier of the active software thread that is executing on the one M logical processor and to output the virtual thread identifier to an array, wherein the first buffer does not differentiate among software threads in processing of entries therein, and wherein the array is coupled to the translation table to store a plurality of entries, where each entry includes one of the N virtual thread identifiers, and to receive the virtual thread identifier from the translation table and to process an entry therein using the virtual thread identifier.

7. The processor of claim 6, wherein:
the control logic is to modify its contents responsive to receipt of a thread switch enable signal.

8. The processor of claim 6, wherein:
each of the M logical processors is to support N/M switch-on-event software threads.

9. A system, comprising:
a memory system;
a simultaneous multithreading (SMT) processor, comprising a plurality of logical processors each to support at least two switch-on event multithreading (SoEMT) software threads; and
the processor further comprising a thread translation table to maintain mapping information for each of the plurality of logical processors, and the at least two SoEMT software threads, and including a plurality of entries each to store a logical processor identifier associated with one of the plurality of logical processors and a virtual thread identifier associated with one of the SoEMT software threads, wherein the thread translation table is to be accessed from a first structure and the corresponding virtual thread identifier is to be output to a second structure that is to use the virtual thread identifier to process entries within the second structure, wherein the thread translation table includes a first entry to store an identity of an active software thread corresponding to one of the at least two SoEMT software threads that is to execute on a first logical processor and a second entry to store an identity of another one of the SoEMT software threads that is to execute on a second logical processor.

10. The system of claim 9, wherein:
the memory system further comprises a dynamic random access memory.

11. The system of claim 9, wherein:
the thread translation table includes entries each to store an identity of one or more inactive software threads corresponding to one of the SoEMT software threads that are not executing on one of the plurality of logical processors.

12. The system of claim 11, wherein:
the inactive software threads further comprise inactive SoEMT software threads.

13. The system of claim 9, wherein:
the thread translation table further comprises control logic to modify its contents responsive to a switch from an active SoEMT software thread to an inactive SoEMT software thread on one of the logical processors.

14. The system of claim 10, wherein:
the thread translation table further comprises logic to determine an active SoEMT software thread for a selected logical processor.

15. The system of claim 11, wherein:
the thread translation table further comprises logic to swap, in its entries, one of the inactive SoEMT software threads for one of the active SoEMT software threads.

16. The system of claim 15, wherein the thread translation table is further to:
perform the swap responsive to a thread switch on one of the logical processors.

17. A computer-implemented method, comprising:
receiving a physical thread identifier from a reorder buffer (ROB) of a processor when the ROB retires a first instruction, the physical thread identifier received in a control logic associated with a thread translation table including a plurality of entries each to store a physical thread identifier associated with one of a plurality of physical threads of the processor and a virtual thread identifier associated with one of a plurality of software threads supported by the plurality of physical threads, wherein a first physical thread is to support two or more of the plurality of software threads and a second physical thread is to support two or more of the plurality of software threads;
accessing a virtual thread identifier stored in an entry of the thread translation table using the physical thread identifier received from the ROB, which corresponds to a virtual software thread currently active on a physical thread corresponding to the physical thread identifier, and forwarding the virtual thread identifier from the thread translation table to a branch predictor that is shared by two or more virtual software threads.

18. The method of claim 17, wherein:
forwarding the virtual thread identifier to the branch predictor further comprises forwarding the virtual thread identifier to the branch predictor whose entries include virtual thread information.

19. The processor of claim 1, further comprising a plurality of thread translation tables, each of the thread translation tables coupled to provide an output to a corresponding structure that uses the virtual thread identifier to process its entries.

20. The system of claim 9, wherein each entry of the thread translation table includes a physical thread identifier corresponding to one of the logical processors and a virtual thread identifier corresponding to one of the SoEMT software threads.

21. The system of claim 20, wherein the first structure of the processor does not distinguish among virtual threads and the thread translation table is to output the virtual thread identifier stored with the physical thread identifier to the second structure of the processor that uses the virtual thread identifier.

* * * * *

UNITED STATES PATENT AND TRADEMARK OFFICE
CERTIFICATE OF CORRECTION

| | |
|---|---|
| PATENT NO. | : 7,669,203 B2 |
| APPLICATION NO. | : 10/741914 |
| DATED | : February 23, 2010 |
| INVENTOR(S) | : Samra et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1596 days.

Signed and Sealed this

Fourth Day of January, 2011

David J. Kappos
*Director of the United States Patent and Trademark Office*